US011074583B2

(12) United States Patent
Bermudez et al.

(10) Patent No.: US 11,074,583 B2
(45) Date of Patent: *Jul. 27, 2021

(54) TECHNIQUES TO PROCESS BIOMETRIC AND TRANSACTION DATA TO DETERMINE AN EMOTIONAL STATE OF A USER WHILE PERFORMING A TRANSACTION

(71) Applicant: Capital One Services, LLC, McLean, VA (US)

(72) Inventors: Sophie Bermudez, Washington, DC (US); Salik Shah, Washington, DC (US); Latika Gulati, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/830,370

(22) Filed: Mar. 26, 2020

(65) Prior Publication Data

US 2021/0019757 A1    Jan. 21, 2021

Related U.S. Application Data

(63) Continuation of application No. 16/515,630, filed on Jul. 18, 2019, now Pat. No. 10,643,213.

(51) Int. Cl.
*G06Q 30/00* (2012.01)
*G06Q 20/40* (2012.01)
(Continued)

(52) U.S. Cl.
CPC ... *G06Q 20/40145* (2013.01); *G06K 9/00885* (2013.01); *G06N 20/00* (2019.01); *G06Q 20/204* (2013.01); *G06Q 20/352* (2013.01); *G06Q 20/42* (2013.01); *G06Q 30/0224* (2013.01); *G06Q 30/0255* (2013.01); *G06K 2009/00939* (2013.01)

(58) Field of Classification Search
CPC .......... G06Q 20/40145; G06Q 20/204; G06Q 20/352; G06Q 20/42; G06Q 30/0224; G06Q 30/0255; G06N 20/00; G06K 9/00885; G06K 2009/00939
See application file for complete search history.

(56) References Cited

U.S. PATENT DOCUMENTS

2015/0363785 A1* 12/2015 Perez ................... G06Q 20/206
                                                            705/44
2017/0278172 A1*  9/2017 Dey .................... G06Q 30/0633
(Continued)

OTHER PUBLICATIONS

Kumarswamy, Sachin, Operationalizing Emotions Based on Click Stream Data on Digital Media Platforms, 2017 (Year: 2017).*

*Primary Examiner* — Matthew L Hamilton
(74) *Attorney, Agent, or Firm* — Kacvinsky Daisak Bluni PLLC

(57) ABSTRACT

Various embodiments are generally directed to method and devices to receive biometric data and transaction data relating to a transaction, apply a model to the biometric data and the transaction data to determine an emotional state of the user during the transaction, and determine an action associated for the transaction based on the emotional state of the user during the performance of the transaction. Embodiments further include causing performance of the action.

20 Claims, 11 Drawing Sheets

(51) Int. Cl.
*G06Q 20/20* (2012.01)
*G06Q 20/42* (2012.01)
*G06Q 20/34* (2012.01)
*G06N 20/00* (2019.01)
*G06K 9/00* (2006.01)
*G06Q 30/02* (2012.01)

(56) References Cited

U.S. PATENT DOCUMENTS

2018/0012228 A1* 1/2018 Milevski ............ G06K 9/00885
2018/0225683 A1* 8/2018 Gromada ......... G06Q 20/40145
2020/0143436 A1* 5/2020 Spath ................. G06Q 30/0282

\* cited by examiner

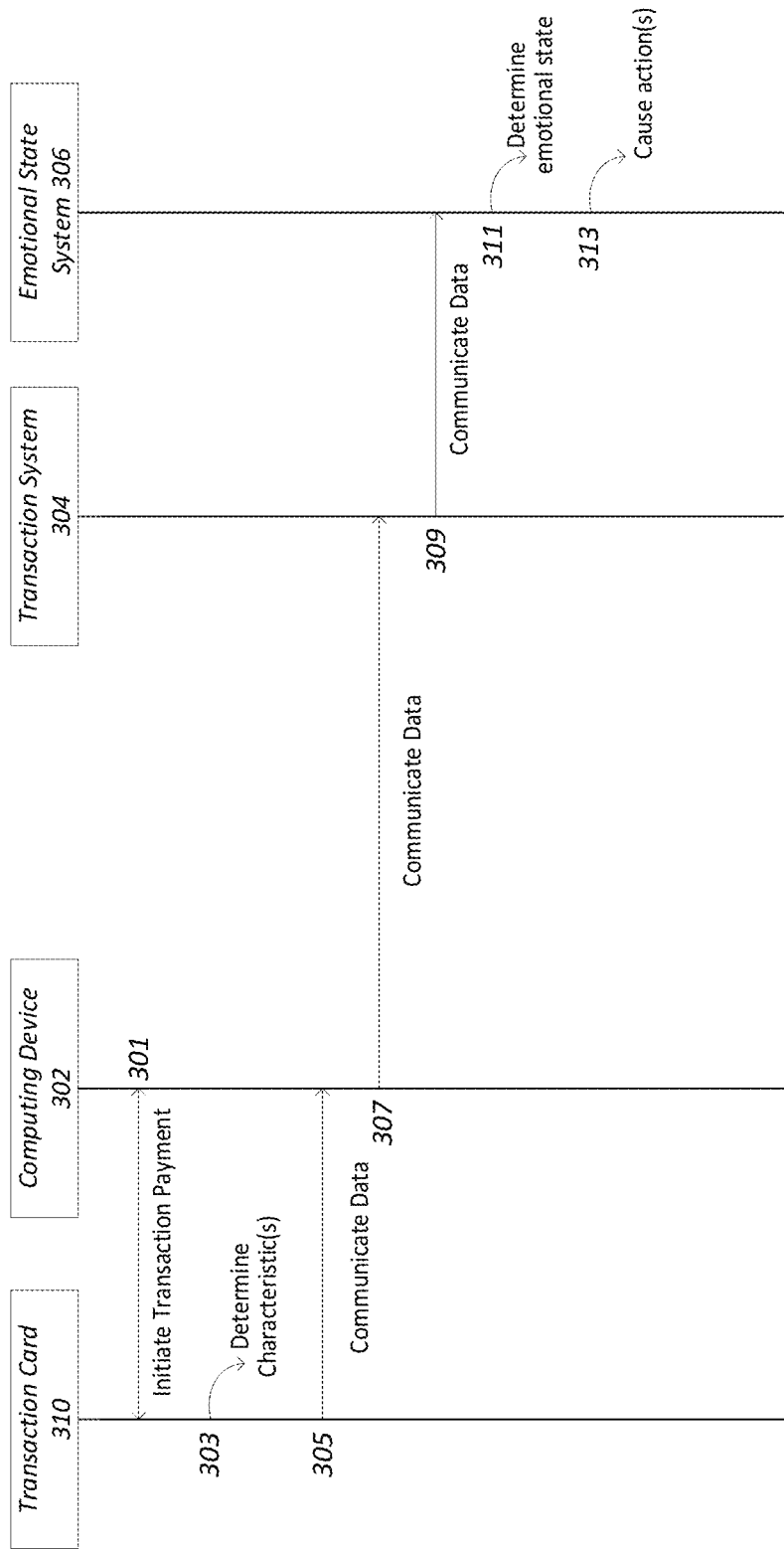

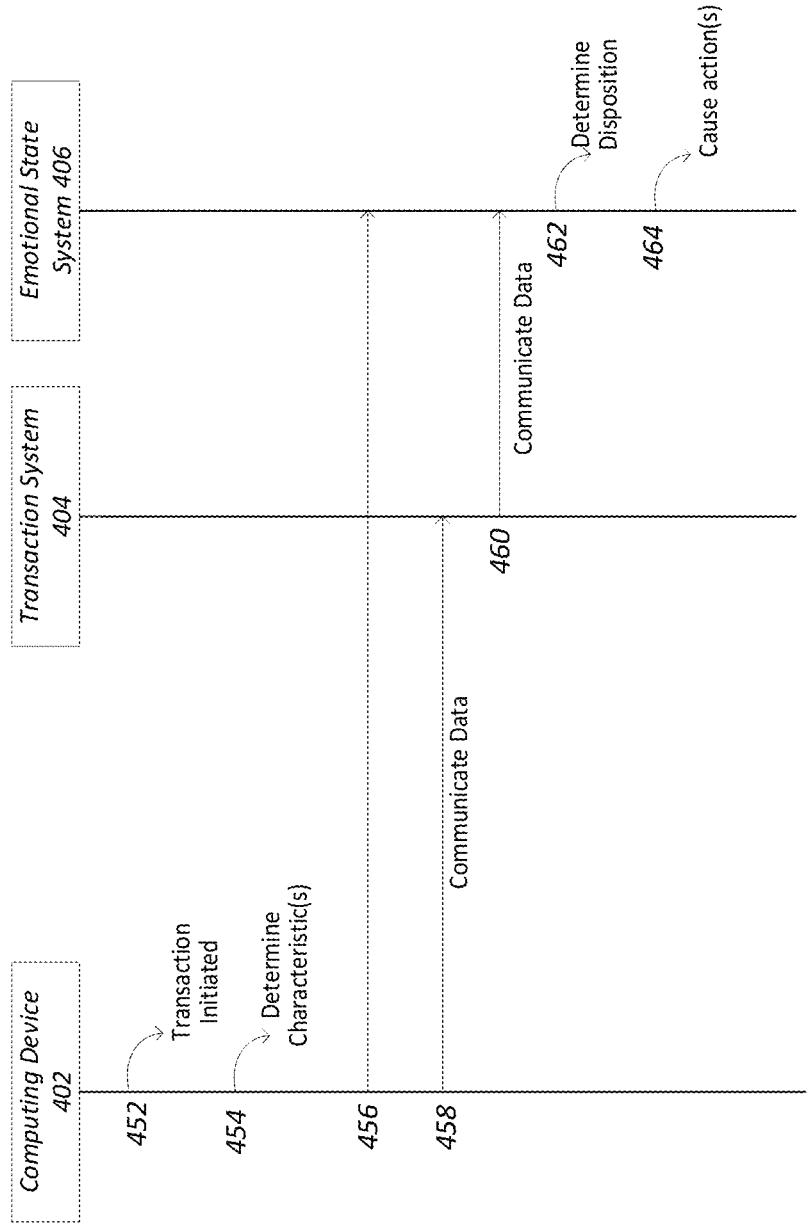

500

RECEIVE, FROM AT LEAST A COMPUTING DEVICE, BIOMETRIC DATA AND TRANSACTION DATA FOR A TRANSACTION
505

APPLY A MODEL TO THE BIOMETRIC DATA AND THE TRANSACTION DATA TO DETERMINE AN EMOTIONAL STATE OF A USER AT A TIME OF THE TRANSACTION
510

DETERMINE AN ACTION FOR THE TRANSACTION BASED ON THE EMOTIONAL STATE OF THE USER AT THE TIME OF THE TRANSACTION
515

CAUSE PERFORMANCE OF THE ACTION
520

FIG. 5

TECHNIQUES TO PROCESS BIOMETRIC AND TRANSACTION DATA TO DETERMINE AN EMOTIONAL STATE OF A USER WHILE PERFORMING A TRANSACTION

RELATED APPLICATIONS

This application is a continuation of U.S. patent application Ser. No. 16/515,630, titled "TECHNIQUES TO PROCESS BIOMETRIC AND TRANSACTION DATA TO DETERMINE AN EMOTIONAL STATE OF A USER WHILE PERFORMING A TRANSACTION" filed on Jul. 18, 2019. The contents of the aforementioned application are incorporated herein by reference in their entirety.

BACKGROUND

Emotions and tactics employed by stores play a huge role in many of the purchases people make. For example, a shopper may be swayed by a clever marketing campaign, a shopper may copy someone else and purchase something because another person has the item, a shopper may purchase a product impulsively, or a shopper may purchase something based on their mood. For example, a person in a good mood may "reward" themselves by making a large purchase. However, in some instances, people may regret making these spur of the moment decisions. Currently there is no system to determine when these types of purchases may occur and inform a shopper that they may be making an irrational purchase.

SUMMARY

Various embodiments described herein may include a device, a system, an apparatus, and so forth including processing circuitry to receive, from at least a computing device, biometric data and transaction data for a transaction. The biometric data may include one or more biometric characteristics of a user detected by one or more biometric devices during performance of a transaction, and the transaction data may include information of the transaction.

The processing circuitry may further apply a model to the biometric data and the transaction data to determine an emotional state of the user during the transaction, the emotional state of the user may include one of a positive emotional state or a negative emotional state, and the model may b trained on historical biometric data and historical transaction data associated with previous transactions and biometric characteristics of users. The processing circuitry may also determine an action associated for the transaction based on the emotional state of the user during the performance of the transaction, wherein the action comprises at least one of an enablement operation, a confirmation operation, and an incentive operation, and cause performance of the action.

BRIEF DESCRIPTION OF THE DRAWINGS

FIG. 3A illustrate an example of a first processing flow based on data.

FIG. 4B illustrates an example of a fourth processing flow based on data.

FIG. 5 illustrates an example of a first logic flow.

DETAILED DESCRIPTION

Figure 1A:
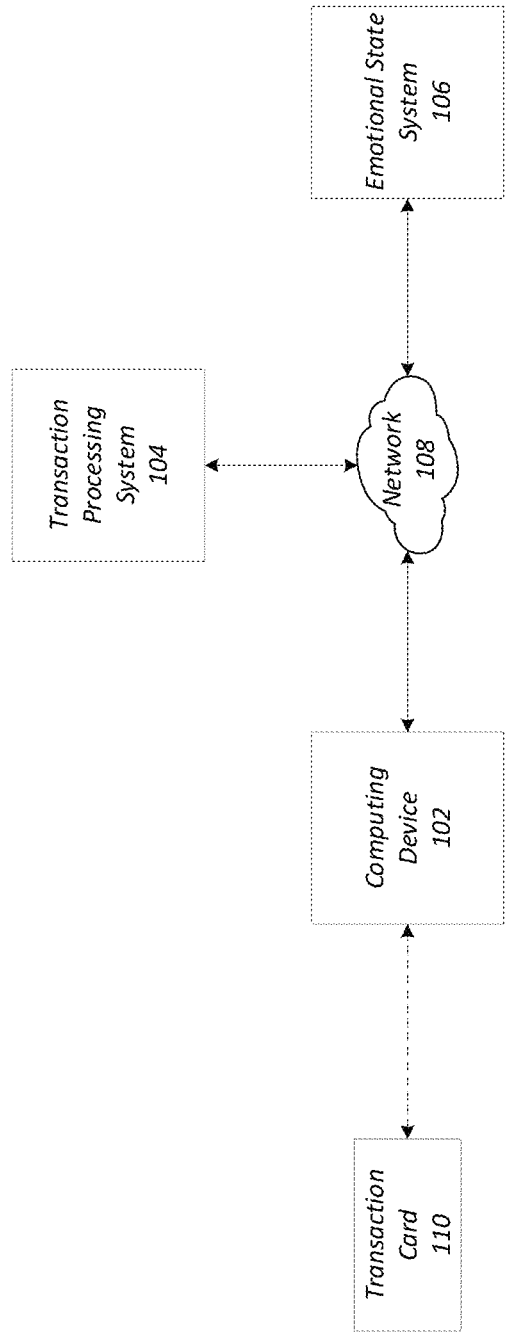
FIG. 1A illustrates an example of a system to determine an emotional state.

Various embodiments are generally directed determining biometric data and transaction data relating to transactions, determining emotional states of users based on the biometric data and transaction data by running the data through a model, and causing actions to be performed the transactions based on the emotional state of the user. In one example, biometric data and/or transaction data may be collected by one or more devices relating to a transaction, e.g., a transaction card used for the transaction, a mobile device, a personal computer, a point-of-sale (POS) terminal, one or more financial computing systems, and so forth and provided to a system, which may process the data by applying a model to the data. The model may be trained on previous or historical biometric data and transaction data for transaction to generate a result indicating an emotional state of the user at the time of the transaction. Further, the system may cause an action, such as requiring a confirmation from the user, or permitting the processing of the transaction based on the emotional state of the user. These and other details will become more apparent in the following description.

Moreover, the systems discussed herein provide advantages over current and prior systems by taken both biometric data and transaction data to more accurately detected when a user is in a good mood, bad mood, is happy about the transaction, is nervous about the transaction, and so forth and use this information to cause performance of an action. For example, the system may detect that a user is in a negative emotional state and nervous about the current transaction. Thus, the system may send a confirmation text message to a mobile device of a user for the user to respond with to continue with the transaction. In another example, the system may determine that the user is in a positive emotional state and is happy about the current transaction. In this example, the system may permit the transaction without requiring a user to confirm the transaction.

Systems discussed herein also provide additional advantages over prior systems by enabling the collection of biometric data and characteristics with devices that are already typically used as part of conducting a transaction. For example, a transaction card may include one or more biometric devices capable of collecting biometric data and providing the data to systems discussed herein. Other examples include collecting and determine biometric data via biometric devices implemented in a mobile device, personal computer, POS terminal, and so forth. Further, the systems and methods discussed implement a particular application by causing actions that are useful the user, e.g., requiring confirmation, permitting a transaction, presenting the user with additional information about the transaction, and so forth. Embodiments are not limited in this manner as will become more apparent in the following description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example of a processing system 100 that is capable of processing information and data relating to transactions performed by users. The processing system 100 may also process information and data associated with the transaction, such as biometric data and transaction data. This data may be used to determine an emotional state of the user around the time of the transaction, e.g., a time period prior to the transaction finalizing and/or while the transaction is being processed. In some instances, the processing system 100 may cause one or more actions to be performed based on the emotional state of the user.

The processing system 100 may be part of a bank or credit card transaction processing system to enable merchants to process transactions for the sale of goods and services. The processing system 100 may include any number of components, device, systems, and so forth to provide these features, as will be discussed in more detail below. In the illustrated example of FIG. 1A, the processing system 100 includes a computing device 102, a transaction processing system 104, and an emotional state system 106, which may all be coupled via a network 108. FIG. 1A illustrates one possible configuration to perform the operations and functions discussed herein. However, embodiments are not limited in this manner and other configurations may exist and may be consistent with the features and implementations discussed herein.

In embodiments, the processing system 100 is capable of processing data associated transactions that may be conducted in any manner. For example, the processing system 100 can process data relating to transactions that are performed at a physical location via a point-of-sale terminal (POS). In another example, the processing system 100 may process data for transactions that may be performed via a website or an application running on a device, such as a mobile phone device, a tablet, a personal computer, and so forth. In some instances, the transaction may be made with a transaction card having account information and communicating with a POS terminal, a mobile device, a personal computer, and so forth. In other instances, the account information may be stored on a device, and retrieved from memory to perform the transaction. Embodiments are not limited in this manner.

In embodiments, the processing system 100 may also collect and process information and data relating to a transaction to determine an emotional state of the user at or around the time of a transaction. In one example, the emotional state may be based on applying a model to biometric data and transaction data associated with the transaction, e.g., biometric characteristics collected at the time of the transaction, and transaction information relating to the transaction. The biometric data may include biometric characteristics be based on biometric measurements taken via one or more devices and include heart rate, skin temperature, skin moisture level, iris size, body temperature, blood pressure, eye movement, user interactions (inputs received via a device), voice characteristics (pitch, volume, frequency, etc), and so forth. Further, the transaction data includes information relating to the transaction, such as price, product/service, time of the transaction, location of the transaction, the weather during transaction, payment method of transaction, funds available for the transaction, transaction history of the user, and so forth. In some instances, the transaction data may be collected and/or retrieved by the computing device 102 and one or more other systems. For example, the transaction data may be collected by the computing device 102 via an interface from a personal computer, a point-of-sale (POS) terminal, one or more financial computing systems, a weather service system, a banking system, a financial institution system, and so forth. In other instances, at least a portion of the transaction data may be directly obtained by the emotional state system 106 from the one or more other systems. Embodiments are not limited to these examples of biometric data and transaction data.

The processing system 100 may include one or more computing device(s) 102 having any number of components utilized to collect and determine biometric data and transaction data relating to a user and a transaction. The computing device 102 also includes interfaces capable of communicating with other devices and systems, e.g., the transaction card 110, and systems 104 and 106. In embodiments, the computing device 102 may be coupled with the transaction processing system 104 and the emotional state system 106 via network 108, which may include wireless interconnects, wired interconnects, and systems and devices to process and coordinate data. The computing device 102, in some instances, may also receive biometric data and/or transaction data from the transaction card 110 coupled via a wireless interconnect or physical coupling (Europay, Mastercard, Visa (EMV) contact pad or magnetic strip), for example. The computing device 102 may provide information, such as the biometric data and transaction data, to the transaction processing system 104 and/or the emotional state system 106 via the network 108. The transaction processing system 104 and the emotional state system 106 may include devices and components capable to process information and data as discussed herein, e.g., servers, storage devices, networking devices, network infrastructure devices, and so forth. In some instances, the transaction processing system 104 and/or emotional state system 106 may at least be partially implemented in a cloud-based processing system. As will be discussed in more detail below, the transaction processing system 104 and the emotional state system 106 may utilize the biometric data, and the transaction data may determine an emotional state of a user and, in some instances, cause an action to be performed.

Figure 1B:
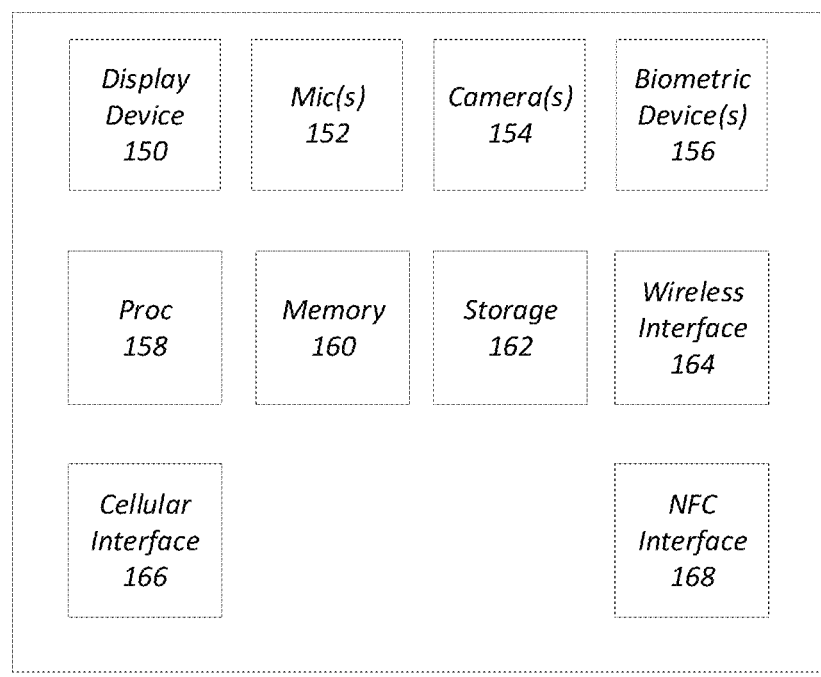
FIG. 1B illustrates an example of a computing device.

FIG. 1B illustrates one example of a computing device 102 that may be utilized to process biometric data and transaction data as part of the processing system 100. The computing device 102 may be any type of device to process information and data and is configured to enable a user to perform a transaction. For example, the computing device 102 may be a POS terminal, a checkout computer, a cash register terminal, a transaction card terminal, a personal computer, a mobile device, a tablet device, and so forth. The computing device 102 may include a display device 150, one or more microphone(s) 152, one or more camera(s) 154, one or more biometric device(s) 156, a processor 158, memory 160, storage 162, one or more wireless interface(s) 164, a cellular interface 166, and a near-field communication (NFC) interface 168.

In embodiments, the display device 150 of the computing device 102 may be any type of display, such as a liquid crystal display (LCD) including a touch interface capable of detecting user interactions. For example, the display device 150 may include the touch interface layered on the top of the display to detect a touch input. A user can provide inputs or control a single or multi-touch gestures by touching the screen (touch interface) with a stylus, one or more fingers, and so forth. The display device 150 including the touch interface may be implemented in any touch detecting technology, such as resistive, capacitive, infrared, optical, etc., and embodiments are not limited in this manner.

In embodiments, the display device 150 can display information and data in a graphical user interface (GUI), which a user may interact with to perform operations discussed herein. In one example, the display device 150 can display a GUI and enable a user to interact with an application, such as an electronic commerce (e-commerce) application, a banking application, a web browser application, and so forth. The GUI may be utilized to perform transactions, e.g., shop on a website, enter account information, enter personal information, and so forth.

The computing device 102 may also include other devices, such as input/output devices, to enable a user to interact with it. For example, computing device 102 may also include one or more microphones 152 and circuitry to detect sound and turn the sound into digital audio data. In one example, the microphone 152 including the circuitry is capable detecting sound made by the user, and convert the sound into digital audio data via digital signal processing techniques and may store the digital audio data in storage/memory. As will be discussed in more detail, the digital audio data may be part of the biometric data communicated to the transaction processing system 104 and the emotional state system 106 for use in determining an emotional state of the user.

In embodiments, the computing device 102 includes other I/O devices, such as one or more cameras 154. The one or more cameras 154 may include a digital camera including circuitry to capture images and video streams and convert the digital video data. The camera 154 may be any type of digital camera and utilize any type of capture technology, such as single-shot, multi-shot, and scanning image capturing. In embodiments, the camera 154 may be utilized by the computing device 102 to capture the digital image data, and the captured digital data may be used to determine an emotional state of a user.

In embodiments, the computing device 102 includes one or more biometric device(s) 156 and circuitry capable of making biometric measurements or readings and generating digital biometric data. For example, the computing device 102 may include a heart rate monitor device, a blood pressure reading device, an iris scanning device, a skin conductivity measurement device, a facial thermography reading device, and so forth. In some instances, these devices may be standalone devices and may be communicatively coupled with the computing device 102, e.g., through Bluetooth or near-field communication (NFC). In one example, a user may wear a watch that measures a user's heart rate and/or blood pressure and may communicate this data to the computing device 102. In other embodiments, one or more biometric device(s) 156 may be integrated into the housing or body of the computing device 102 and embodiments are not limited in this manner.

In some embodiments, a biometric device 156 may include I/O device, such as a touchscreen input and at least partially be implemented in software that while executing on circuitry generates the biometric data. For example, the computing device 102 may receive inputs via a touch interface of a user interacting with an application and/or web browser. The computing device 102 may determine the user interactions, via the software and circuitry, are associated with the user browsing an e-commerce site or the like and track the browsing patterns. For example, computing device 102 may determine an e-commerce application is being displayed in the GUI and collect browsing patterns. The browsing patterns may include data such as a frequency in which a user is interacting with a website, time spent on a page of a website, time spent by a user browsing a website, rapid inputs detected, what the user is interacting with on the webpage, etc. The browsing patterns may also include characteristics of the user browser, such as speed of a user's touch inputs and pressure of the user's touch inputs. The software may be implemented as an applet or application executing in a web browser or as a process running in the background while a user has a browser or application open. In another example, the data may be collected by an application itself. Embodiments are not limited in this manner.

In embodiments, the computing device 102 includes other components, such as one or more processors 158. Processor 158 may include one or more processing cores to process information and data. Moreover, the one or more processors 158 can include one or more processing devices, such as a microprocessor manufactured by Intel™ AMD™, or any of various processors. The disclosed embodiments are not limited to any type of processor(s).

Coupled with the processor(s) 158, the computing device 102 may also include memory 160. Memory 160 can include one or more memory (volatile or non-volatile) devices configured to store instructions used by the one or more processors 158 to perform one or more operations consistent with the disclosed embodiments. For example, memory 160 can be configured with one or more software instructions, such as programs and applications that can perform one or more operations when executed by the one or more processors 158.

The disclosed embodiments are not limited to separate programs or computers configured to perform dedicated tasks. For example, memory 160 can include a single program that performs the operations or could comprise multiple programs. Memory 160 can also store data that can reflect any type of information in any format that the system can use to perform operations consistent with the disclosed embodiments.

In embodiments, the computing device 102 may include one or more storage devices 162. The storage devices 162 may include HDDs, flash memory devices, optical storage devices, floppy storage devices, etc. In some instances, the storage devices 162 may include cloud-based storage devices that may be accessed via a network interface. In some embodiments, the storage 162 may be configured to store one or more databases and/or as a distributed database system to store information and data.

In embodiments, the computing device 102 may include a wireless interface 164 capable of communicating wirelessly in accordance with one or more protocols, such as those that operate in accordance with the Institute of Electrical and Electronics Engineers (IEEE) 802.11 set of standards, and/or Bluetooth standard. The wireless interface 164 may include any number of components to enable wireless communication, including but not limited to, a transceiver (transmitter/receiver), analog-to-digital converters (vice versa), digital signal processing circuitry, analog circuitry, memory, etc. In embodiments, the wireless interface 164 may be coupled with one or more antennas to communicate wirelessly.

The computing device 102 includes a cellular interface 166 capable of communicating wirelessly in accordance with one or more protocols, General Packet Radio Service (GPRS) standard, global system for mobile communications (GSM) standard, standards maintained by 3$^{rd}$ Generation Partnership Project (3GPP), Evolved High Speed Packet Access (+HSPA) standard, Long-Term Evolution (LTE), and so forth. The cellular interface 166 may include any number of components to enable wireless communication, including but not limited to, a transceiver (transmitter/receiver), analog-to-digital converters (vice versa), digital signal processing circuitry, analog circuitry, memory, etc. In embodiments, the cellular interface 166 may be coupled with one or more antennas to communicate wirelessly.

The computing device 102 includes an NFC interface 168 capable of communicating wirelessly in accordance with the NFC protocol The NFC interface 168 may include any number of components to enable wireless communication, including but not limited to, a transceiver (transmitter/receiver), analog-to-digital converters (vice versa), digital signal processing circuitry, analog circuitry, memory, etc. In embodiments, the NFC interface 168 may be coupled with one or more antennas to communicate wirelessly. In embodiments, the computing device 102 may communicate with transaction processing system 104, the emotional state system 106, and/or the transaction card 110 via one or more interfaces 164, 166, and/or 168, as will be discussed in more detail below.

Figure 2A:
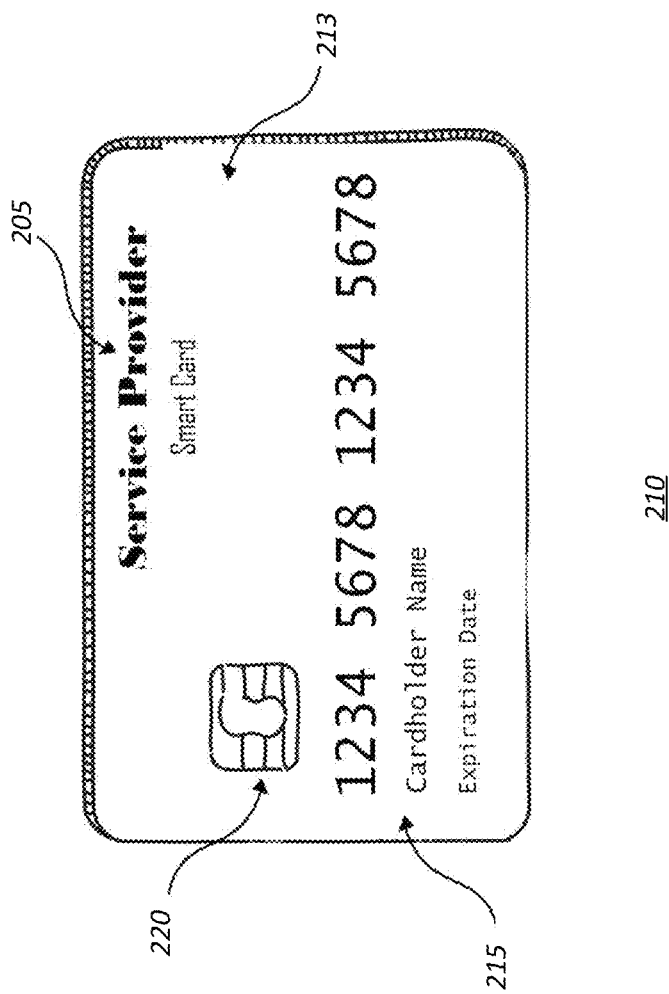
FIG. 2A illustrates an example of a transaction card.

FIG. 2A illustrates an example configuration of a transaction card 210, which may be the same as or similar to the transaction card 110, and include a payment card, such as a credit card, debit card, or gift card, issued by a service provider displayed on the front or back of the transaction card 210. In some examples, the transaction card 210 is not related to a payment card and may include, without limitation, an identification card. In some examples, the transaction card 210 may include a dual interface contactless payment card. For example, the transaction card 210 may include one or more chips including circuitry to communicate via the EMV protocol and/or NFC protocol, for example.

The transaction card 210 may include a substrate 213, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the transaction card 210 may have physical characteristics compliant with the ID-1 format of the ISO/IEC 7810 standard, the ISO/IEC 7816 standard, and the transaction card may otherwise be compliant with the ISO/IEC 14443 standard. However, it is understood that the transaction card 210 according to the present disclosure may have different characteristics.

The transaction card 210 may also include identification information 212 displayed on the front and/or back of the card. In embodiments, the transaction card 210 may include an integrated chip, such as an EMV chip, that enables the performance of a transaction via a client device, such as a payment terminal or payment device. The transaction card 210 may also include one or more contact pads, such as contact pad 220, capable of coupling with a contact pad of the client device 102.

In embodiments, the integrated chip may include components, such as processing circuitry, memory, one or more antennas, and other components, and may be capable of processing payment data to perform transactions with the client device and detecting biometric data of a user. These components may be located behind and coupled with one or more of the contact pads, e.g., the contact pad 220 or contact pad 224, or elsewhere on the substrate 213.

Figure 2B:
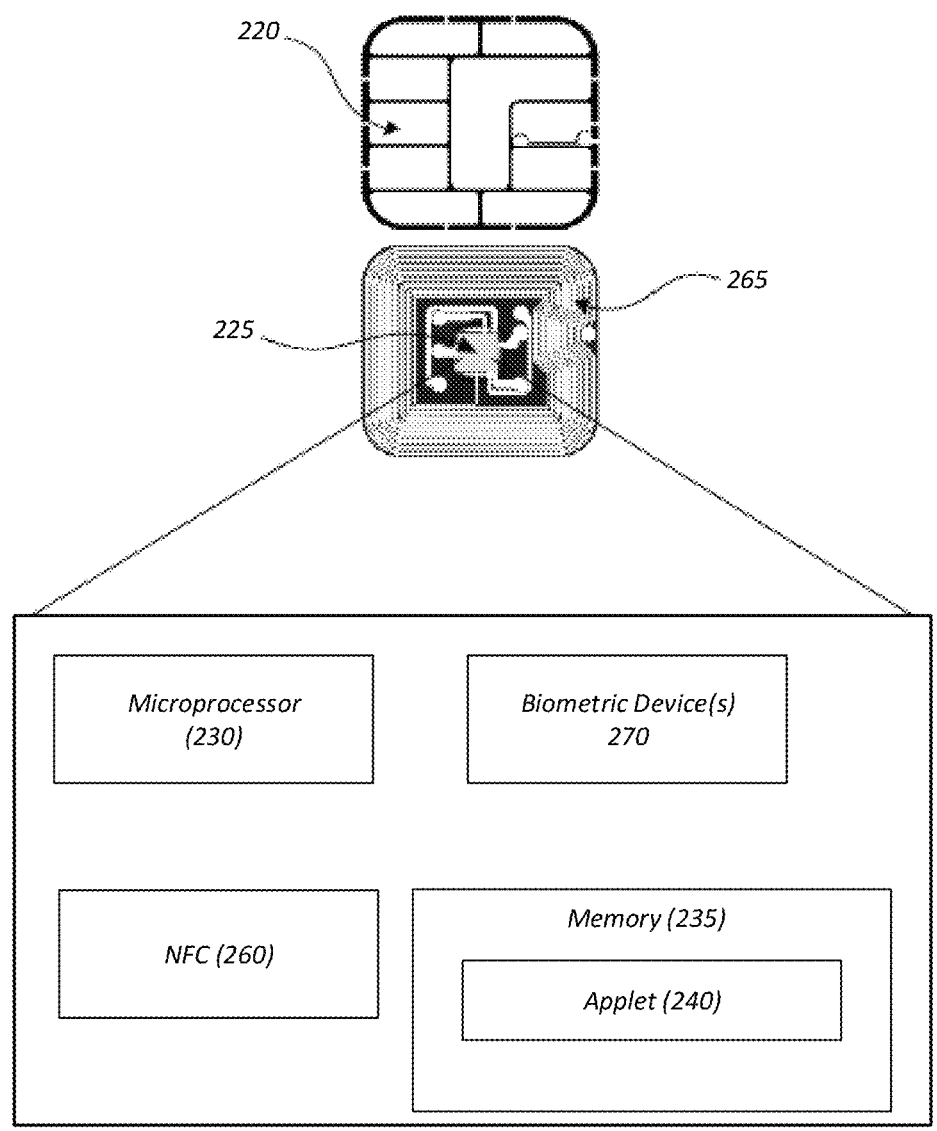
FIG. 2B illustrates an example of processing circuitry of a transaction card.

FIG. 2B illustrates a detailed view of an example integrated chip 225 and components. As illustrated in FIG. 2B, the contact pad 220 may be coupled with the integrated chip 225 including processing circuitry and memory for storing and processing information. More specifically, the integrated chip 225 includes a microprocessor 232 and a memory 235. It is understood that the processing circuitry 222 may contain additional components, including processors, memories, error and parity/CRC checkers, data encoders, anti-collision algorithms, controllers, command decoders, security primitives, and tamper-proofing hardware, as necessary to perform the functions described herein.

The memory 235 may be a read-only memory, write-once read-multiple memory or read/write memory, e.g., RAM, ROM, and EEPROM, and the transaction card 210 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 235 may be configured to store one or more applets 240. The one or more applets 240 may include one or more software applications configured to execute on one or more transaction cards, such as Java Card applet. However, it is understood that applets 240 are not limited to Java Card applets, and instead may be any software application operable on transaction cards or other devices having limited memory.

In embodiments, the transaction card 210 may also include an NFC device 260 capable of communicating in accordance with an NFC protocol. The NFC device 260 may operate passively and may be energized by a signal emitted by an NFC device of the client device. The NFC device 260 may draw its power from the electromagnetic field caused by the NFC device of the client device, for example. However, embodiments are not limited in this manner; for example, the NFC device 260 may provide power to another device. In another example, the transaction card 210 may be provided with a power source (not shown) operable to supply power to the NFC device 260 such that it can activate its own electromagnetic field, for example.

In some examples, the transaction card 210 may include one or more antennas 255. The one or more antennas 255 may be placed within the transaction card 210 and around the processing circuitry 222 of the contact pad 220. For example, the one or more antennas 255 may be integral with the processing circuitry 222 and the one or more antennas 255 may be used with an external booster coil. As another example, the one or more antennas 255 may be external to the contact pad 220 and the processing circuitry 222.

In embodiments, the integrated chip 225 may include one or more biometric devices 270 capable of detecting and processing biometric data. In some embodiments, the biometric devices 270 may be separate from the integrated chip 225 and implemented in different Silicon, for example. In these instances, the biometric devices 270 may be coupled with the integrated chip 225 via one or more buses are traces, such that the microprocessor 230 may process the biometric data. For example, the microprocessor 230 may collect and store the biometric data in memory 235 and communicate the data to a computing device via NFC device 260 or an EMV chip read. Embodiments are not limited in this manner.

The biometric devices 270 the computing device 102 may include a heart rate monitor device, a blood pressure reading device, an iris scanning device, a skin conductivity measurement device, a facial thermography reading device, a camera, microphone, and so forth. A biometric device 270 may perform one or more measurements of a user, generate biometric data, and the microprocessor 230 may communicate the biometric data to a computing device and/or other systems, such that it may be utilized to determine an emotional state of a user.

FIG. 3A illustrates one example of a communication and processing flow 300 to process biometric data and transaction data to determine an emotional state of a user at a time of a transaction. FIG. 3A illustrates the transaction card 310, the computing device 302, the transaction processing system 304, and the emotional state system 306. In the illustrated example, the transaction card 310 may include one or more biometric devices, as discussed in FIG. 2B and transaction card 210, which are capable of generating biometric data. The transaction card 310 may determine the biometric data and perform an information exchange with a computing device 302, such as a mobile phone or a POS terminal, to send the biometric data to the computing device 302. In embodiments, the transaction card 310 may provide, and the computing device 302 may receive transaction data, as will be discussed in more detail below.

In embodiments, at line 303 a transaction payment may be initiated. In one example, a transaction may be initiated based on a user tapping or placing the transaction card 310 on or near the computing device 302, e.g., via NFC. In another example, the transaction may be initiated, and an exchange may occur between the devices upon the transaction card 310 being placed into the computing device 302, e.g., an EMV chip reader of the computing device 302 reading data via the EMV protocol from the transaction card 310.

At line 303, the transaction card 310 may determine biometric characteristics and data associated with the transaction via one or more biometric devices of the transaction card 310. Examples of the biometric data collected may include digital image data collected by a camera or iris scanner, digital audio data collected by a microphone, digital heart rate data collected by a heart rate monitor, digital blood pressure data collected by a blood pressure reading device, digital conductivity measurement data collected by a skin conductivity measurement device, digital thermography data collected a facial thermography reading device, and so forth.

In embodiments, the transaction card 310 may communicate, at line 305, the biometric data to the computing device 302 via NFC, an EMV exchange, Bluetooth, or another wireless protocol and the biometric data may include information based on the type of biometric device(s) of the transaction card 310 used to collect the data.

In embodiments, the biometric data may be a sample or snippet of data from a time prior to the initiation of the transaction, e.g., the action detected at line 301. The transaction card 310 may collect the biometric data on a continuous and/or periodic basis, e.g., every half second, and store the collected biometric data in the memory. The biometric data may be updated in the memory and, in some instances, a memory buffer may be utilized. Thus, when the transaction is initiated the transaction card, 310 may communicate the biometric data to the computing device 302 that was stored in memory, which includes biometric data stored in memory for a set time period of time before the initiation. The transaction card 310 may continue to send biometric data recorded during the transaction until the transaction is complete and/or another action or event has occurred, e.g., the transaction is canceled.

In embodiments, the transaction card 310 may also communicate transaction data to the computing device 302 at line 305. The transaction data may include information relating to the transaction, accounting information, user information, expiration data information, account holders name information, and so forth. The information may be stored in the memory of the transaction card 310 and retrieved to send to the computing device 302, for example.

In some embodiments, the computing device 302 may determine at least a portion of the biometric data and/or transaction data itself and/or via communicating with other devices. For example, the computing device 302 may be coupled with a biometric device, such as a smartwatch that may provide heart rate, blood pressure, and other information to the computing device 302. The computing device 302 may also determine transaction information, such as the goods and/or services of the transaction, the cost or amount of the transaction, the time of the transaction, the day of the transaction, the location of the transaction, and so forth.

At line 307, the computing device 302 may communicate the biometric data and transaction data to the transaction processing system 304. The data may be communicated through one or more wired and/or wireless links, such as network 108. In one example, the computing device 302 may be a POS terminal and the transaction processing system 304 may be part of a banking system, a credit card processing system, a debit card processing, a financial institution system, and so forth. In another example, the computing device 302 may be a mobile device and the transaction may be processed through the transaction processing system 304, which may be part of an e-commerce website. Embodiments are not limited to these examples.

At line 309, the transaction processing system 304 communicates the biometric and the transaction data to the emotional state system 306. Further and at line 311, the emotional state system 306 may process the data to determine an emotional state of a user at the time of the transactions. For example, the emotional state system 306 generates a machine-learning model(s) to be applied to the biometric data and/or the transaction data. The model(s) may be trained with historical biometric data and transaction data as inputs, for example.

In embodiments, the emotional state system 306 may generate a model utilizing both historical biometric data and historical transaction data. In embodiments, the historical biometric data provides one or more biometric measurements of users around the time of transactions. The biometric measurements may include a heart rate, skin temperature, skin moisture level, iris size, body temperature, blood pressure, eye characteristic (movement, blinking, etc.), user interactions (inputs received via a device), voice characteristics (pitch, volume, frequency, etc.), facial characteristics (features, expressions, etc.), and so forth. In embodiments, the historical transaction data may include details of the transaction, such as the cost of the transaction, the good/service of the transaction, the location of the purchase of the good/service. Using biometric data and transaction data as inputs to train the model may increase the accuracy in predicting the emotional state of the user. For example, a high correlation may exist between purchasing an expensive item, such as a television or electronic device, and one or more biometric characteristics, e.g., an increase in blood pressure and skin moisture content may indicate a nervous or high anxiety emotional state and be associated with users buying expensive goods. Alternatively, The emotional state system 306

In embodiments, the emotional state system 306 may be configured to train models to identify emotions in discrete categories or dimensionally. The discreet modeling includes defining emotions into discrete and different constructs, while dimensional modeling characterizes emotions on a dimensional basis in groupings. In embodiments, the discrete modeling may include categorizing a user into one of six recognized emotions—happiness, sadness, fear, surprise, disgust, and anger. These emotions are universally accepted emotions that a user may be defined. There are particular characteristics, e.g., biometric readings and transaction characteristics, that may be associated with each of these categories and the emotional state system 306 may train, using historical biometric and training data, one or more models to detect users experiencing or in one of these emotional states during a transaction. In some instances, the emotional state system 306 may further categorize each of the six emotions into either a positive emotion or a negative emotion—the positive emotions may include happiness and surprise, while the negative emotions may include sadness, fear, disgust, and anger.

Dimensional modeling may define emotions according to one or more dimensions, e.g., pleasurable vs. unpleasurable, arousing vs. subduing, and strain vs. relaxation. The emotional state system 306 may generate one or more models to detect where a user is emotionally in one or more of these emotional dimensions. In embodiments, the emotional state system 306 may reduce the analysis to determine a polarity of emotions, positive and negative. For example, if a model predicts a user is a pleasurable and relaxed state, the emotional state system 306 may indicate a positive state. By way of contrast, if the emotional state system 306 determines a user is unpleasurable and strained, the system may indicate a negative emotional state. These characterizations may be fined tuned based on the modeling and actual results/feedback of the system.

In some embodiments, the emotional state system 306 may apply different types of modeling based on one or more of the data types, e.g., digital audio data, digital image data, etc. For example, the biometric data may include digital audio data and the emotional state system 306 may apply machine learning voice processing techniques and modeling. The deep learning model(s) may be trained on transaction data, and biometric data including previous voice captures and sounds. The deep learning model may take into account voice attributes, such as pitch, timbre, loudness, and vocal tone. Embodiments are not limited in this manner.

In another example, the emotional state system 306 may apply machine-learning image/video data techniques to digital image data to determine an emotional state of the user. For example, a model trained using historical digital image data may be applied to a current digital image data to determine an emotional state of the user. In one specific example, embodiments may include utilizing Carnegie Mellon University's algorithm utilizing convolutional neural networks (CNNs) to detect micro-expressions. In this example, a spatial CNN is pre-trained on faces from an image data base, and a temporal CNN is utilized to determine changes over time. The emotional state system 306 may apply the CNNs to the digital image data having video frames, which use both pixel data and optical flow data of the digital image data to capture spatial and temporal information. The CNNs generate machine learned features, and both streams of data are integrated into a single classifier that predicts the emotion associated with the micro-expression. In another example, a factorized variational auto encoders (FVAE) method may be utilized and applied to the captured user's face. Embodiments are not limited in this manner and may include other artificial intelligence algorithms and modeling approaches that can be used to detect an emotional state of a user based on digital image data.

In embodiments and at line 314, the emotional state system 306 may cause one or more actions to be performed based on the emotional state of the user at the time of the transaction. The action may relate the transaction itself and/or the user performing the transaction. Moreover, the action may be based on whether the emotional state is one of a positive emotional state or a negative emotional state. In other instances, the action may be based on which one of the six emotions determined if discrete modeling is utilized or which dimension or combination of dimensions is determined if dimensional molding is utilized.

In embodiments, the actions may include, but are not limited to, permitting the transaction to proceed and finalized, initializing a confirmation operation, initializing an incentive operation, delaying the transaction for a period of time, preventing the transaction, sending information or data to a device of the user, sending advertisements of products relating to the product of the current transaction, and so forth. In embodiments, the confirmation operation may include requiring the user to confirm that they wish to proceed with the transaction, e.g., sending a text message and requiring an approval response, causing a confirmation message in application, prompting the user on a POS terminal, prompting an attendant to ask the user at the POS terminal, and so forth. In embodiments, the incentive operation may include sending the user a coupon for the product, providing the user with a promotional interest rate for the transaction, sending coupons for related items, and so forth. Embodiments are not limited to these examples.

In embodiments, the emotional state system 306 may be configured to cause an action based on a particular emotional state determination. For example, the emotional state system 306 may be configured to cause a confirmation operation if the emotional state analysis determines that the user is in a negative emotional state. In another example, the emotional state system 306 may be configured to cause an incentive operation of the emotional state analysis determines that the user is a negative emotional state. Alternatively, the emotional state system 306 may be configured to cause the incentive operation if the user is in a positive emotional state. In a third example, the emotional state system 306 may permit the transaction to proceed when the user is in a positive emotional state. Each action to be performed may be preconfigured and set by an administrator, for example, and stored in a memory of the emotional state system 306. Thus, the emotional state system 306 may determine which emotional state the user is in, perform a lookup in memory or storage having a database, and determine one or more actions to perform. In some instances, emotional state system 306 may apply machine-learning to historical transaction information to determine which actions to perform for desirable results. Embodiments are not limited in this manner.

In embodiments, the emotional state system 306 may cause an action by sending one or more messages, e.g., communicating requests and responses, to the computing device 302 and/or to the transaction processing system 304 through an application programming interface (API). The request may be a call to a function to cause the action on the computing device 302 or the transaction processing system 304, for example. The function may be a set of instructions, that when executed, cause the action.

Figure 3B:
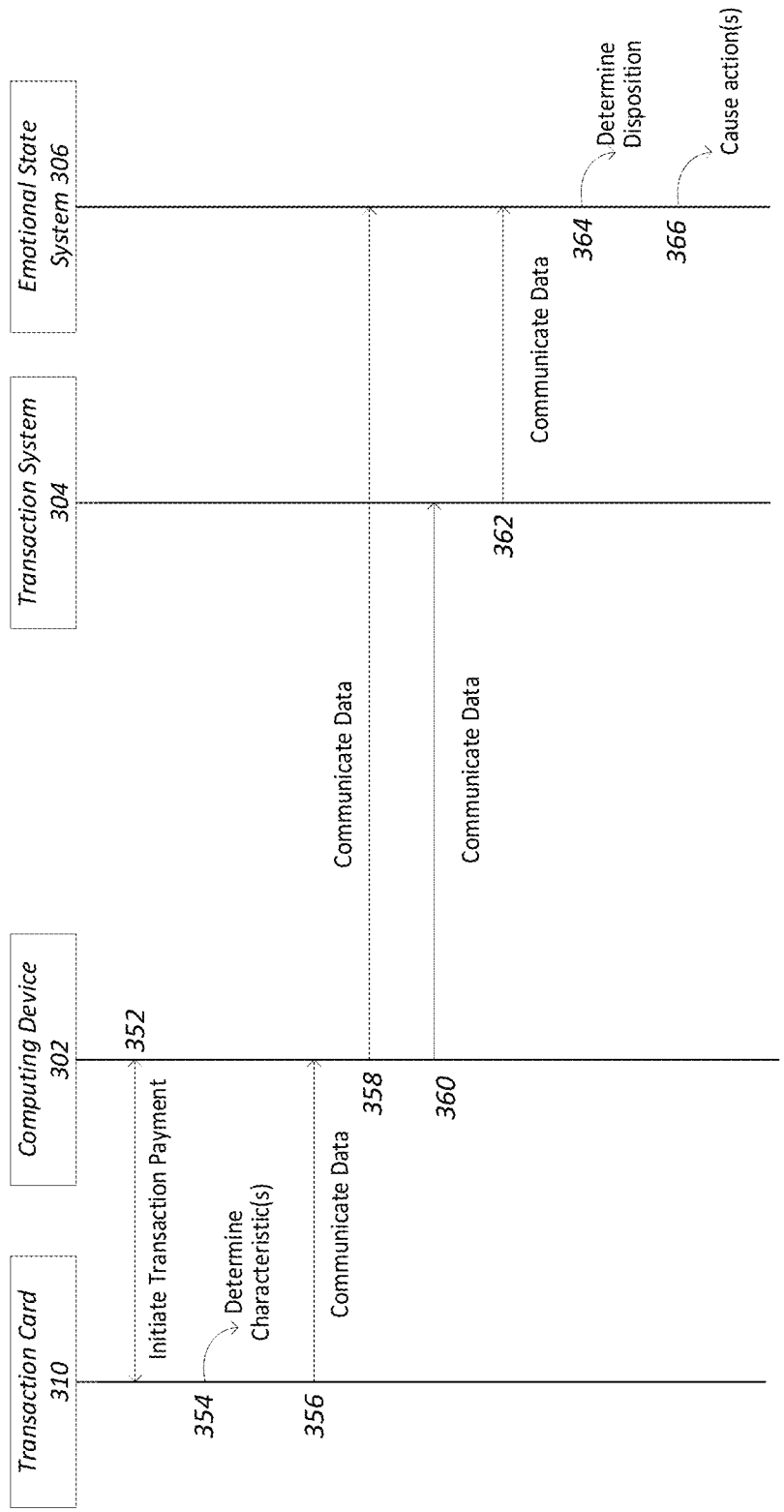
FIG. 3B illustrates an example of a second processing flow based on data.

FIG. 3B illustrates a second example of a communication and processing flow 350 to process biometric data and transaction data to determine an emotional state of a user at a time of a transaction. FIG. 3B is similar to the processing flow 300 illustrated in FIG. 3A. However, in this example, the computing device 302 may communicate at least a portion of the biometric data and/or transaction data directly with the emotional state system 306, as illustrated at line 358.

In embodiments, at line 352 the transaction payment may be initiated based on an event such as a user tapping or placing the transaction card 310 on or near the computing device into the computing device. The triggering event causes the exchange of data between the transaction card 310 and the computing device 302.

At line 354, the transaction card 310 may determine biometric data and transaction data associated with the transaction and may communicate, at line 356, the data to the computing device 302 via NFC, an EMV exchange, Bluetooth, or another wireless protocol. In some embodiments, the computing device 302 may determine at least a portion of the biometric data and/or transaction data itself and/or via communicating with other devices, as previously discussed.

At line 358, the computing device 302 may communicate the biometric data and transaction data to the emotional state system 306. The data may be communicated through one or more wired and/or wireless links, such as network 108, for example. The computing device 302, at line 360, may also communicate data to the transaction processing system 304, such as at least a portion of the transaction data, and the transaction processing system 304 may use the transaction data to process the transaction.

At line 362, the transaction processing system 304 may also communicate transaction data to the emotional state system 306. The transaction data may be stored and maintained by the transaction processing system 304 and may be relevant to the transaction, e.g., account balance information, credit score, etc., currently taken place.

The emotional state system 306 may process the data to determine an emotional state of a user at the time of the transactions at block 364. For example, the emotional state system 306 may generate machine-learning model(s) to be applied to the biometric data and/or the transaction data received from the computing device 302 and/or the transaction processing service 304, as similarly discussed above with respect to line 311 in FIG. 3A. Further and at line 366, the emotional state system 306 may cause one or more actions to be performed based on the emotional state of the user at the time of the transaction.

Figure 4A:
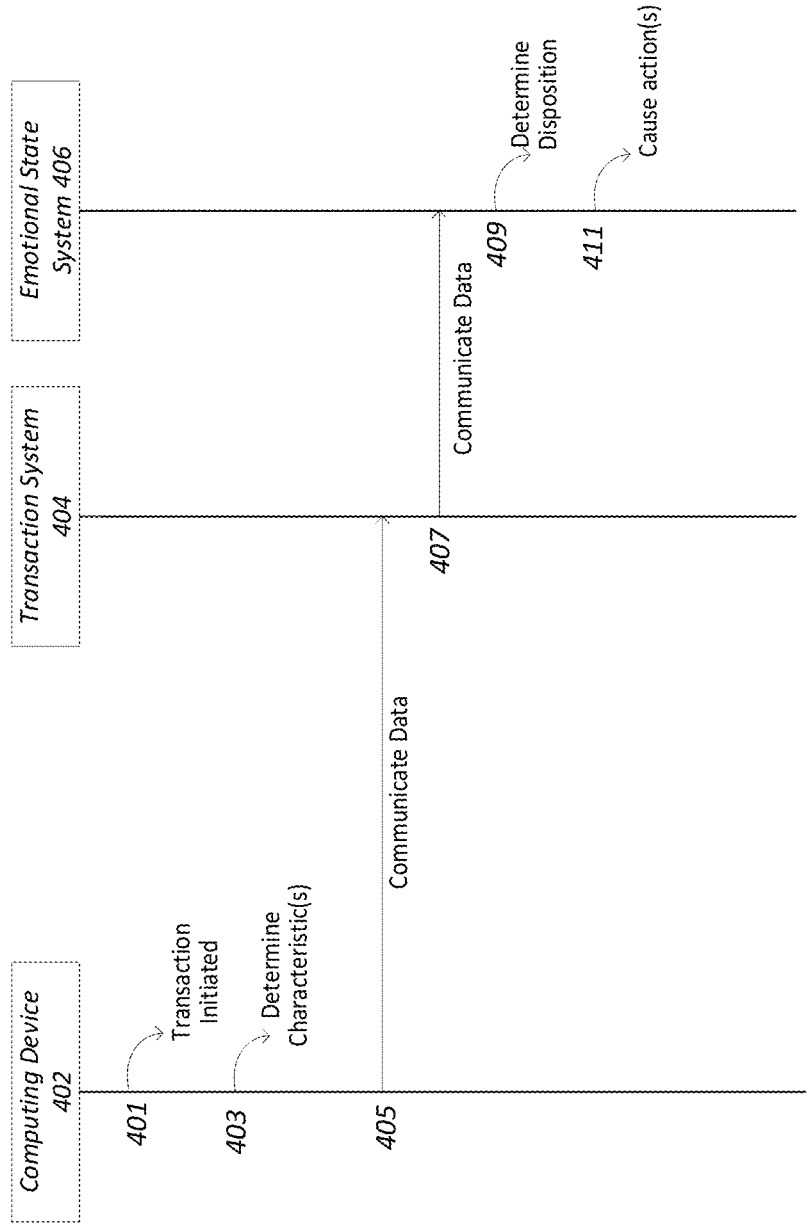
FIG. 4A illustrates an example of a third processing flow based on data.

FIG. 4A illustrates a third example of a communication and processing flow 400 to process biometric data and transaction data to determine an emotional state of a user at a time of a transaction. FIG. 4A is similar to processing flow 300 illustrated in figure FIG. 3A. However, in this example, the transaction may be performed on the computing device 402 and the computing device 402 may determine the biometric data and the transaction data for the transaction, e.g., the computing device 402 includes one or more biometric devices to collect/determine biometrics of a user.

In embodiments, at line 401, a transaction may be initiated by a user of the computing device 402. The initiation may be based on a user purchasing a product or service through an application and/or web browser executing on the computing device 402. At line 403, the computing device 402 may determine biometric characteristics and transaction data associated with the transaction. As similarly discussed, the computing device 402 may include biometric devices that collect biometrics of the user, e.g., continuously and/or periodically, and may store the biometric data associated with the transaction in memory and/or storage.

At line 405, the computing device 402 may communicate the biometric data and transaction data to the transaction processing system 404. At line 407, the transaction processing system 404 may communicate the biometric data and transaction data to the emotional state system 406. In some instances, the transaction processing system 404 may determine at least a portion of the transaction data to send to the emotional state system 106, such as account balance information, credit score, etc.

The emotional state system 406 may process the data to determine an emotional state of a user at the time of the transactions at block 409. For example, the emotional state system 406 may generate machine-learning model(s) to be applied to the biometric data and/or the transaction data received from the computing device 402 and/or the transaction processing service 404. Further and at line 411, the emotional state system 106 may cause one or more actions to be performed based on the emotional state of the user at the time of the transaction.

FIG. 4B illustrates a fourth example of a communication and processing flow 450 to process biometric data and transaction data to determine an emotional state of a user at a time of a transaction. FIG. 4B is similar to processing flow 300 illustrated in FIG. 3A and processing flow 4A illustrated in FIG. 4A. However, in this example, the transaction may be performed on the computing device 402, the computing device 402 may determine the biometric data and the transaction data for the transaction, e.g., the computing device 402 includes one or more biometric devices to collect/determine biometrics of a user, and the computing device 402 may send the biometric data and transaction data to the emotional state system 406.

In embodiments, at line 452 a transaction may be initiated by a user of the computing device 402. The initiation may be based on a user purchasing a product or service through an application and/or web browser executing on the computing device 402. At line 454, the computing device 402 may determine biometric characteristics and transaction data associated with the transaction. As similarly discussed, the computing device 402 may include biometric devices that collect biometrics of the user, e.g., continuously and/or periodically, and may store the biometric data associated with the transaction in memory and/or storage.

At line 456, the computing device 402 may communicate the biometric data and transaction data to the emotional state system 406. At line 458, the computing device 402 may also communicate transaction information to the transaction processing system 404. The data may be used by the transaction processing system 404 to perform the transaction. At line 460, the transaction processing system 404 may provide at least a portion of the transaction data to the emotional state system 406

The emotional state system 406 may process the data to determine an emotional state of a user at the time of the transactions at block 462. For example, the emotional state system 406 may generate machine-learning model(s) to be applied to the biometric data and/or the transaction data received from the computing device 402 and/or the transaction processing service 404. Further and at line 464, the emotional state system 406 may cause one or more actions to be performed based on the emotional state of the user at the time of the transaction.

FIG. 5 illustrates an example of a first logic flow 500 to determine an emotional state of a user during a transaction. FIG. 5 illustrates an example of a logic flow 500 that may be representative of some or all of the operations executed by one or more embodiments and systems described herein, such as those discussed above in FIGS. 1A-4B.

At block 505, the logic flow 500 may include receiving biometric data and transaction data for a transaction. For example, an emotional state system may receive data via one or more wired, and wireless interconnects, e.g., one or more networks, from a transaction processing system and/or a computing device. The biometric data and transaction data may include data collected during the performance of the transaction, e.g., from a time prior to the transaction to a time after the transaction or initiation transaction. For example, the biometric data and transaction data may include data collected one second before initiation of the transaction through one second after initiation for a total of two seconds of data. In embodiments, the amount of the time of collected may be user-defined, predefined by a system, based on applying models to historical data and so forth. Moreover, the biometric data may include biometric characteristics of the user collected by one or more devices, and the transaction data may include data for the transaction, as previously discussed.

In embodiments and at block 510, the logic flow includes applying a model to the biometric data and the transaction data to determine an emotional state of a user at the time of the transaction. As previously discussed, at the time of the transaction may include a period before the transaction to after the transaction, or the initiation of the transaction. In some embodiments, the model indicates a result of being applied to the data indicating whether the user is in a positive emotional state or a negative emotional state. The model may be trained on historical biometric data and transaction data, as previously discussed. In some instances, the model may indicate a range of emotional states, e.g., the six recognized categories and/or dimensionally, and embodiments are not limited in this manner.

At block 515, the logic flow 500 includes determining an action for the transaction based on the emotional state of the user during the performance of the transaction. In embodiments, the action may be based on whether the emotional state is a positive emotional or a negative emotional state. For example, the system may determine to allow the transaction to process if the user is in a positive emotional state. In another example, the system may determine to cause the user to confirm the transaction prior to permitting the transaction if the system determines the user is in a negative emotional state, which may be an indication that the user is not happy and/or is unsure about the transaction. In some instances, more than one action may be performed, e.g., a transaction may be permitted to occur, and the user may be presented with advertisements of related goods. In another example, a user may be required to confirm the transaction and may be presented with different options to buy the item.

At block 520, the logic flow 500 includes causing the action. In embodiments, the emotional state system may send one or more messages to other systems or devices to cause the action, for example. The messages may be communicated through an API and include information specific to cause the action, e.g., causing execution of code by processing circuitry. In some instances, the messages may be an API call to cause execution of code on another device or system. e.g., the computing device or the transaction processing system. In other instances, the messages themselves may include at least a portion of code (executable instructions) that may be executed on the other device. Embodiments are not limited in this manner.

Figure 6:
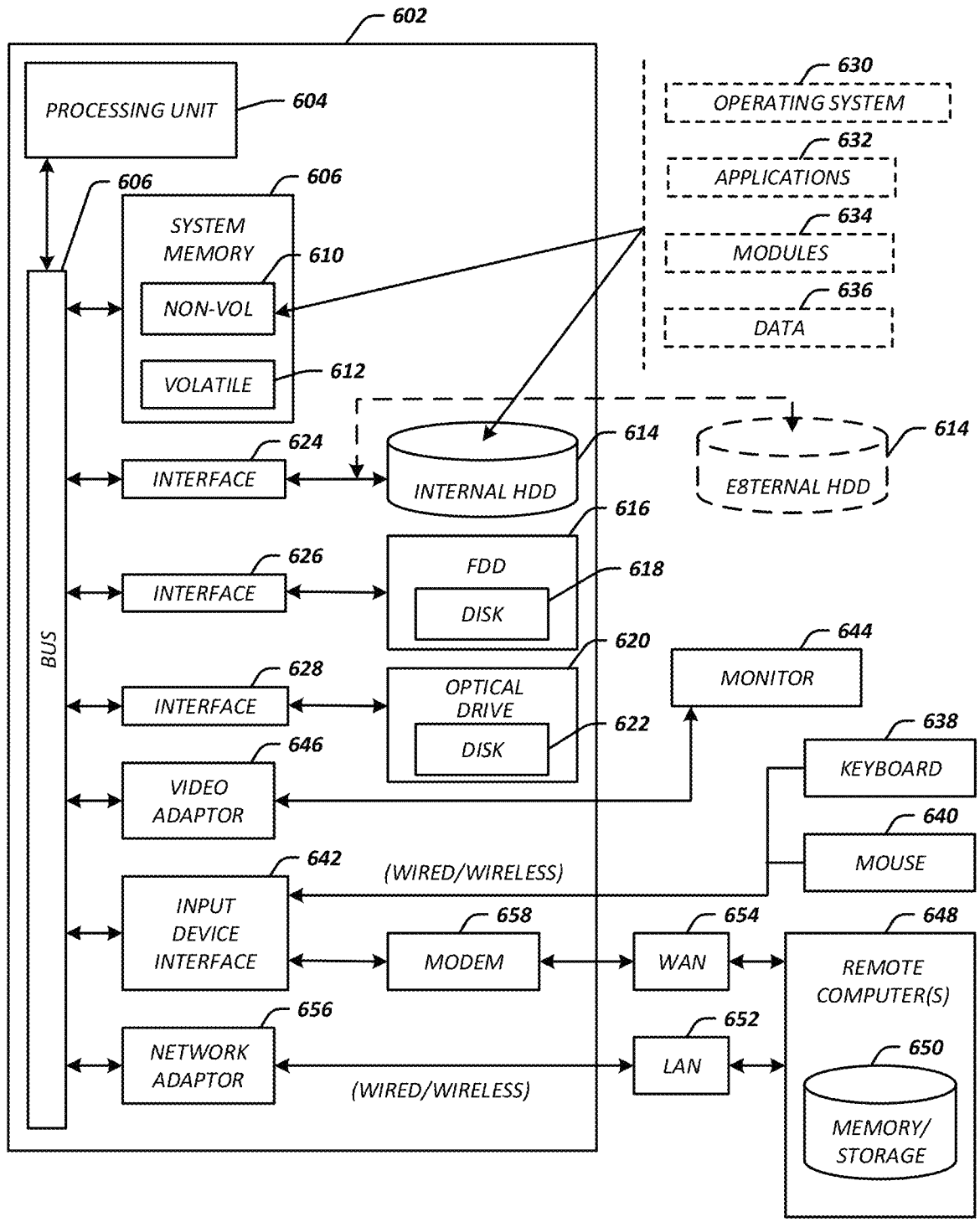
FIG. 6 illustrates an embodiment of a computing architecture.

FIG. 6 illustrates an embodiment of an exemplary computing architecture 600 suitable for implementing various embodiments as previously described. In one embodiment, the computing architecture 600 may include or be implemented as part of system 100.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal.

Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600. In embodiments, the computing architecture 600 may include elements that are part of devices and systems discussed herein, e.g., computing device 102, transaction processing system 104, and emotional state system 106.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608 but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
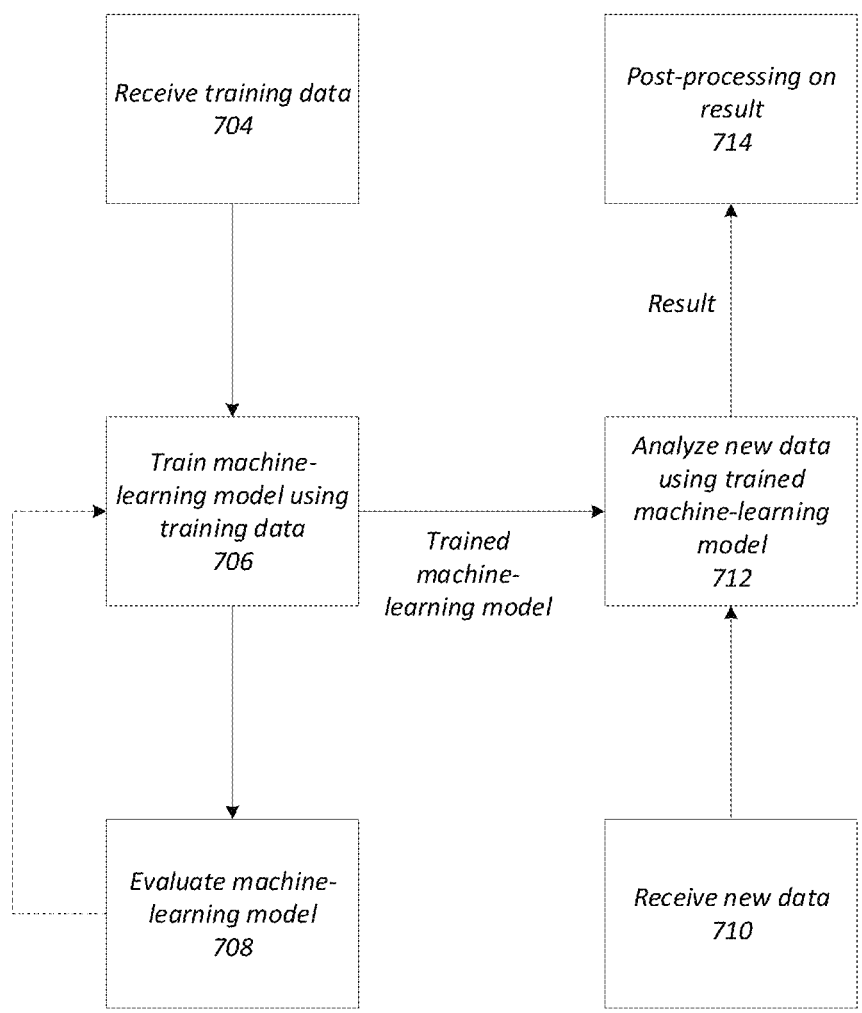
FIG. 7 illustrates an example processing flow to perform machine-learning operations.

FIG. 7 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance. In one specific example, machine-learning models may be applied to perform operations and tasks as discussed herein, e.g., determine contextual search terms, determine rules, etc.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 7.

In block 704, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In embodiments, the training data may include information, such as the biometric data and the transaction data of transactions. The biometric data and transaction data may be for a general population and/or specific to a user and user account in a financial institutional database system, for example.

In block 706, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 708, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. In this example, the inputs may be the biometric data and the transaction data, the outputs may be determined emotional state of users, and the desired outputs may be known emotional states of the user. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 706, where the machine-learning model can be further trained using additional training data or otherwise modified to improve accuracy. If the machine-learning model has an adequate degree of accuracy for the particular task, the process can continue to block 710.

In block 710, new data is received, e.g., biometric data and transaction data for a current transaction. In some examples, the new data is received from a remote database or a local database, constructed from various subsets of data, or input by a user. The new data may be unknown to the machine-learning model. For example, the machine-learning model may not have previously processed or analyzed the new data.

In block 712, the trained machine-learning model is used to analyze the new data and provide a result, which may indicate the emotional state of a user. For example, the new data can be provided as input to the trained machine-learning model. The trained machine-learning model can analyze the new data and provide a result that includes a classification of the new data into a particular class, e.g., a positive emotional state or negative emotional state, a clustering of the new data into a particular group, a prediction based on the new data, or any combination of these.

In block 714, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

In embodiments, the processing flow of FIG. 7 may be executed any number of times and embodiments are not limited in this manner. In some instances, a model may be retrained or additional training may occur after new data is collected, e.g., on a periodic basis, after a number of new transactions, initiated by an administrator of the system, and so forth. The retrained model than may be applied in accordance with the blocks discussed above.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system, comprising:
   a memory to store instructions; and
   one or more processors, coupled with the memory, the one or more processors operable to execute the instructions, that when executed, cause the one or more processors to:
   apply a model to user interaction data and transaction data associated with a transaction, the user interaction data including inputs and browsing patterns detected by an application or a web browser to perform the transaction, and the model trained on historical user interaction data and historical transaction data associated with previous transactions;
   determine an emotional state associated of a user during the transaction based on a result of the model applied to the user interaction data and the transaction data, the emotional state comprising one of a positive emotional state or a negative emotional state;
   in response to determining the user is in the negative emotional state:
   communicate an incentive offer for the transaction and a confirmation request to a computing device to prompt the user to confirm the transaction, and process a response to the confirmation request received from the computing device; and
   in response to determining the user is in the positive emotional state, cause performance of the transaction.

2. The system of claim 1, wherein the browsing patterns include a frequency the user is interacting with a website associated with the transaction, an amount of time the user has spent on the website, an amount of time the user has spent on a particular webpage of the website, or a combination thereof.

3. The system of claim 1, wherein the browsing patterns including a speed of a user touch inputs, a pressure of the user touch inputs, or a combination thereof.

4. The system of claim 1, wherein the response indicates acceptance or denial of the transaction.

5. The system of claim 1, the one or more processors, in response to determining the user is in the negative emotional state, to send a product suggestion related to the product for the transaction.

6. The system of claim 1, the one or more processors:
   in response to determining the user is in the negative emotional state, and the response indicates acceptance of the transaction, cause the performance of the transaction; and
   in response to determining the user is in the negative emotional state, and the response indicates denial of the transaction, prevent occurrence of the transaction.

7. The system of claim 1, wherein the transaction data comprises one or more of a date the transaction, a time of the transaction, a location of the transaction, one or more items of the transaction, a payment device used for the transaction, and an account number associated with the payment device.

8. A computer-implemented method, comprising:
   applying, by one or more processors, a model to user interaction data and transaction data associated with a transaction, the user interaction data including inputs and browsing patterns detected by an application or a web browser to perform the transaction, and the model trained on historical user interaction data and historical transaction data associated with previous transactions;
   determining, by the one or more processors, an emotional state associated of a user during the transaction based on a result of application of the model the emotional state comprising one of a positive emotional state or a negative emotional state;
   in response to determining the user is in the negative emotional state:
   communicate an incentive offer for the transaction and a confirmation request to a computing device to prompt the user to confirm the transaction, and process a response to the confirmation request received from the computing device;
   and in response to determining the user is in the positive emotional state, cause performance of the transaction.

9. The computer-implemented method of claim 8, wherein the browsing patterns include a frequency the user is interacting with a website associated with the transaction, an amount of time the user has spent on the website, an amount of time the user has spent on a particular webpage of the website, or a combination thereof.

10. The computer-implemented method of claim 8, wherein the browsing patterns including a speed of a user touch inputs, a pressure of the user touch inputs, or a combination thereof.

11. The computer-implemented method of claim 8, wherein the response indicates acceptance or denial of the transaction.

12. The computer-implemented method of claim 8, comprising sending, in response to determining the user is in the negative emotional state, a product suggestion related to the product for the transaction.

13. The computer-implemented method of claim 8, comprising:
   causing, in response to determining the user is in the negative emotional state, and the response indicates acceptance of the transaction, the performance of the transaction; and
   preventing, in response to determining the user is in the negative emotional state, and the response indicates denial of the transaction, occurrence of the transaction.

14. The computer-implemented method of claim 8, wherein the transaction data comprises one or more of a date the transaction, a time of the transaction, a location of the transaction, one or more items of the transaction, a payment device used for the transaction, and an account number associated with the payment device.

15. A non-transitory computer-readable storage medium storing computer-readable program code executable by a processor to:
   apply a model to user interaction data and transaction data associated with a transaction to determine an emotional state associated with a user during the transaction, the user interaction data including inputs and browsing patterns detected by an application or a web browser to perform the transaction, and the model trained on historical user interaction data and historical transaction data associated with previous transactions, and the emotional state comprising one of a positive emotional data or a negative emotional state:
   in response to determining the user is in the negative emotional state:
   communicate an incentive offer for the transaction and a confirmation request to a computing device to prompt the user to confirm the transaction, and
   receive and process a response to the confirmation request from the computing device;
   and in response to determining the user is in the positive emotional state, cause performance of the transaction.

16. The non-transitory computer-readable storage medium of claim 15, wherein the browsing patterns include a frequency the user is interacting with a web site associated with the transaction, an amount of time the user has spent on the website, an amount of time the user has spent on a particular webpage of the website, a speed of a user touch inputs, a pressure of the user touch inputs, or a combination thereof.

17. The non-transitory computer-readable storage medium of claim 15, wherein the response indicates acceptance or denial of the transaction.

18. The non-transitory computer-readable storage medium of claim 15, wherein the response indicates acceptance of the transaction, cause performance of the transaction, and wherein the response indicates denial of the transaction, prevent occurrence of the transaction.

19. The non-transitory computer-readable storage medium of claim 15, wherein the user is in the negative emotional state, send a product suggestion related to the product for the transaction.

20. The non-transitory computer-readable storage medium of claim 15, wherein the transaction data comprises one or more of a date the transaction, a time of the transaction, a location of the transaction, one or more items of the transaction, a payment device used for the transaction, and an account number associated with the payment device.

* * * * *